US007225697B2

(12) United States Patent
Schalk et al.

(10) Patent No.: US 7,225,697 B2
(45) Date of Patent: Jun. 5, 2007

(54) POWER TRANSMISSION ARRANGEMENT

(75) Inventors: Wesley R. Schalk, Camas, WA (US); Allan G. Olson, Camas, WA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 269 days.

(21) Appl. No.: 10/657,973

(22) Filed: Sep. 9, 2003

(65) Prior Publication Data

US 2004/0046826 A1 Mar. 11, 2004

Related U.S. Application Data

(62) Division of application No. 10/164,119, filed on May 31, 2002, now Pat. No. 6,890,055.

(51) Int. Cl.
*F16H 57/00* (2006.01)

(52) U.S. Cl. ............................ 74/405; 74/395; 74/396

(58) Field of Classification Search .................. 74/405, 74/745, 325, 335, 337.5, 354, 392, 395, 396, 74/397, 398, 399, 406, 409, 411, 412 R, 413, 74/414, 384, 380

See application file for complete search history.

(56) References Cited

U.S. PATENT DOCUMENTS 571,224 A * 11/1896 Galloway .................... 74/354
638,194 A * 11/1899 Arnold ........................ 74/405
2,681,035 A * 6/1954 Browne et al. ............. 118/705
2,854,855 A * 10/1958 Dudley ........................ 74/405
2,856,787 A * 10/1958 Haupt ......................... 74/354
3,943,786 A * 3/1976 Mills ........................... 74/384
4,046,334 A * 9/1977 Kato et al. ............... 242/333.7
4,133,216 A * 1/1979 Gentile et al. ................ 74/384
4,347,009 A * 8/1982 Brown ....................... 400/611
4,760,751 A * 8/1988 Kasamatsu .................. 74/354
4,843,903 A * 7/1989 Tanaka et al. ................ 74/354
5,020,386 A * 6/1991 Taig ............................ 74/384
5,273,480 A * 12/1993 Suto ........................... 446/456
5,417,370 A * 5/1995 Kah, Jr. ...................... 239/242
5,559,538 A 9/1996 Nguyen et al.
5,697,603 A * 12/1997 Kato .......................... 271/114
5,788,330 A * 8/1998 Ryan ..................... 297/378.12
5,831,644 A * 11/1998 Kato ........................... 347/22

(Continued)

FOREIGN PATENT DOCUMENTS

EP 0676291 A1 10/1995

(Continued)

OTHER PUBLICATIONS

Partial European Search Report mailed Oct. 2, 2003.

(Continued)

*Primary Examiner*—Richard Ridley
*Assistant Examiner*—Matthew A. Johnson

(57) ABSTRACT

A power transmission arrangement includes a shaft, a first gear mounted on the shaft, a plate supported by the shaft and rotatable between a first position and a second position, a second gear supported by the plate and engaged with the first gear, and a third gear supported by the plate and movable between a disengaged position and an engaged position with the second gear when the plate is rotated between the first position and the second position.

12 Claims, 8 Drawing Sheets

U.S. PATENT DOCUMENTS

| | | | | |
|---|---|---|---|---|
| 5,841,450 | A | 11/1998 | Kawamura | |
| 5,867,185 | A | 2/1999 | Yun | |
| 5,886,714 | A | 3/1999 | Burney et al. | |
| 6,000,779 | A | 12/1999 | Ng et al. | |
| 6,070,482 | A | 6/2000 | Kugio et al. | |
| 6,132,026 | A | 10/2000 | Taylor et al. | |
| 6,155,680 | A | 12/2000 | Belon et al. | |
| 6,172,691 | B1 * | 1/2001 | Belon et al. | 347/32 |
| 6,328,412 | B1 | 12/2001 | Taylor et al. | |
| 6,547,236 | B1 * | 4/2003 | Yip et al. | 271/115 |
| 6,561,618 | B1 | 5/2003 | Simmons et al. | |
| 6,666,446 | B2 * | 12/2003 | Gaarder et al. | 271/10.04 |
| 6,846,060 | B2 * | 1/2005 | Waller et al. | 347/22 |

FOREIGN PATENT DOCUMENTS

| | | |
|---|---|---|
| EP | 1020296 A2 | 7/2000 |
| JP | 06083119 | 3/1994 |
| JP | 08135680 | 5/1996 |
| JP | 09242843 | 9/1997 |

OTHER PUBLICATIONS

Full European Search Report having European Application No. 03253179.0 mailed Jan. 20, 2004.

* cited by examiner

POWER TRANSMISSION ARRANGEMENT

CROSS REFERENCE TO RELATED APPLICATION(S)

This is a divisional of application Ser. No. 10/164,119 filed on May 31, 2002, now U.S. Pat. No. 6,890,055, which is hereby incorporated by reference herein.

BACKGROUND

An inkjet printing system may include a printhead and an ink supply which supplies liquid ink to the printhead. The printhead ejects ink drops through a plurality of orifices or nozzles and toward a print medium, such as a sheet of paper, so as to print onto the print medium. Typically, the orifices are arranged in one or more arrays such that properly sequenced ejection of ink from the orifices causes characters or other images to be printed upon the print medium as the printhead and the print medium are moved relative to each other.

An inkjet printing system may include a print media transport assembly which moves and/or routes the print medium through a print media path, a carriage assembly which moves the printhead relative to the print medium, and a service station assembly which maintains functionality of the printhead. The print media transport assembly typically includes a paper pick-up assembly which brings the print medium into the printing system, a drive or feed roller assembly which advances the print medium through the printing system, and a paper path motor which operates the paper pick-up assembly and the feed roller assembly. The carriage assembly typically includes a carriage which carries the printhead and a carriage motor which operates the carriage. Furthermore, the service station assembly typically includes a service station motor which operates functions of the service station assembly.

Operation of these types of inkjet printing systems, therefore, involves the operation of three separate motors. More specifically, operation of the inkjet printing system involves the operation of a paper path motor, a carriage motor, and a service station motor. Unfortunately, the use of three motors adds to the size, complexity, and cost of these types of inkjet printing systems.

SUMMARY OF THE INVENTION

A power transmission arrangement includes a shaft, a first gear mounted on the shaft, a plate supported by the shaft and rotatable between a first position and a second position, a second gear supported by the plate and engaged with the first gear, and a third gear supported by the plate and movable between a disengaged position and an engaged position with the second gear when the plate is rotated between the first position and the second position.

DESCRIPTION OF THE PREFERRED EMBODIMENTS

In the following detailed description of the preferred embodiments, reference is made to the accompanying drawings which form a part hereof, and in which is shown by way of illustration specific embodiments in which embodiments of the invention may be practiced. In this regard, directional terminology, such as "top," "bottom," "front," "back," "leading," "trailing," etc., is used with reference to the orientation of the Figure(s) being described. Because components of the embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore; is not to be taken in a limiting sense, and the scope of the present invention is defined by the appended claims.

Figure 1:
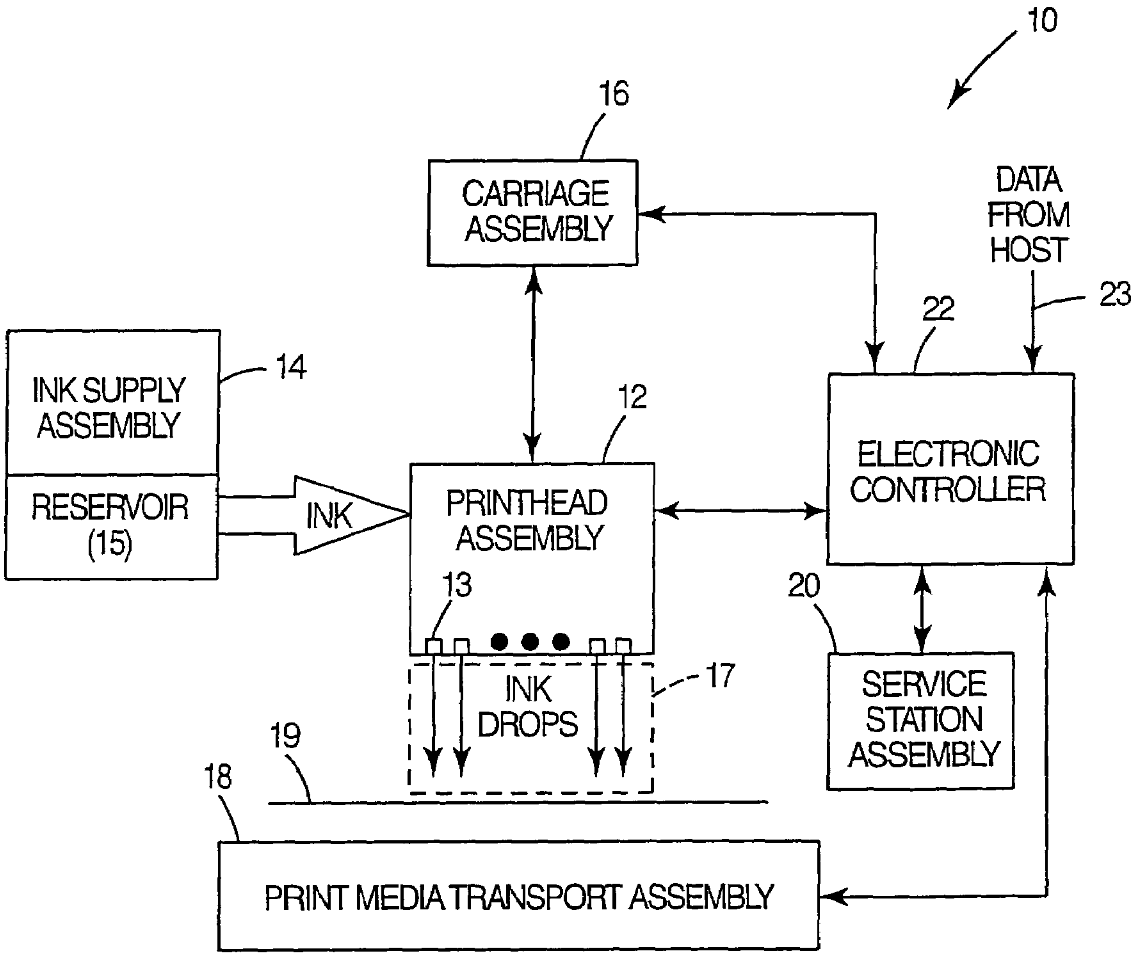
FIG. 1 is a block diagram illustrating one embodiment of an inkjet printing system according to an embodiment of the present invention.

FIG. 1 illustrates one embodiment of an inkjet printing system 10 according to embodiments of the present invention. Inkjet printing system 10 includes an inkjet printhead assembly 12, an ink supply assembly 14, a carriage assembly 16, a print media transport assembly 18, a service station assembly 20, and an electronic controller 22. Inkjet printhead assembly 12 includes one or more printheads which eject drops of ink through a plurality of orifices or nozzles 13 and toward an embodiment of media, such as print medium 19, so as to print onto print medium 19. Print medium 19 is any type of suitable sheet material, such as paper, card stock, transparencies, Mylar, cloth, and the like. Typically, nozzles 13 are arranged in one or more columns or arrays such that properly sequenced ejection of ink from nozzles 13 causes characters, symbols, and/or other graphics or images to be printed upon print medium 19 as inkjet printhead assembly 12 and print medium 19 are moved relative to each other.

Ink supply assembly 14 supplies ink to inkjet printhead assembly 12 and includes a reservoir 15 for storing ink. As such, ink flows from reservoir 15 to inkjet printhead assembly 12. In one embodiment, inkjet printhead assembly 12 and ink supply assembly 14 are housed together in an inkjet cartridge or pen. In another embodiment, ink supply assembly 14 is separate from inkjet printhead assembly 12 and supplies ink to inkjet printhead assembly 12 through an interface connection, such as a supply tube. In either embodiment, reservoir 15 of ink supply assembly 14 may be removed, replaced, and/or refilled.

Carriage assembly 16 positions inkjet printhead assembly 12 relative to print media transport assembly 18 and print media transport assembly 18 positions print medium 19 relative to inkjet printhead assembly 12. Thus, a print zone 17 is defined adjacent to nozzles 13 in an area between inkjet printhead assembly 12 and print medium 19. In one embodiment, inkjet printhead assembly 12 is a scanning type printhead assembly. As such, carriage assembly 16 moves inkjet printhead assembly 12 relative to print media transport assembly 18 to scan print medium 19.

Service station assembly 20 provides for spitting, wiping, capping, and/or priming of inkjet print assembly 12 in order to maintain a functionality of inkjet printhead assembly and, more specifically, nozzles 13. In one embodiment, service station assembly 20 includes a rubber blade or wiper which is periodically passed over inkjet printhead assembly 12 to wipe and clean nozzles. 13 of excess ink. In one embodiment, service station assembly 20 includes a cap which covers inkjet printhead assembly 12 to protect nozzles 13 from drying out during periods of non-use. In one embodiment, service station assembly 20 includes a spittoon into which inkjet printhead assembly 12 ejects ink to insure that reservoir 15 maintains an appropriate level of pressure and fluidity and that nozzles 13 do not clog or weep. Functions of service station assembly 20 include relative motion between service station assembly 20 and inkjet printhead assembly 12.

Electronic controller 22 communicates with inkjet printhead assembly 12, carriage assembly 16, print media transport assembly 18, and service station assembly 20. Electronic controller 22 receives data 23 from a host system, such as a computer, and includes memory for temporarily storing data 23. Typically, data 23 is sent to inkjet printing system 10 along an electronic, infrared, optical or other information transfer path. Data 23 represents, for example, a document and/or file to be printed. As such, data 23 forms a print job for inkjet printing system 10 and includes one or more print job commands and/or command parameters.

In one embodiment, electronic controller 22 provides control of inkjet printhead assembly 12 including timing control for ejection of ink drops from nozzles 13. As such, electronic controller 22 defines a pattern of ejected ink drops which form characters, symbols, and/or other graphics or images on print medium 19. Timing control and, therefore, the pattern of ejected ink drops, is determined by the print job commands and/or command parameters.

Figure 2:
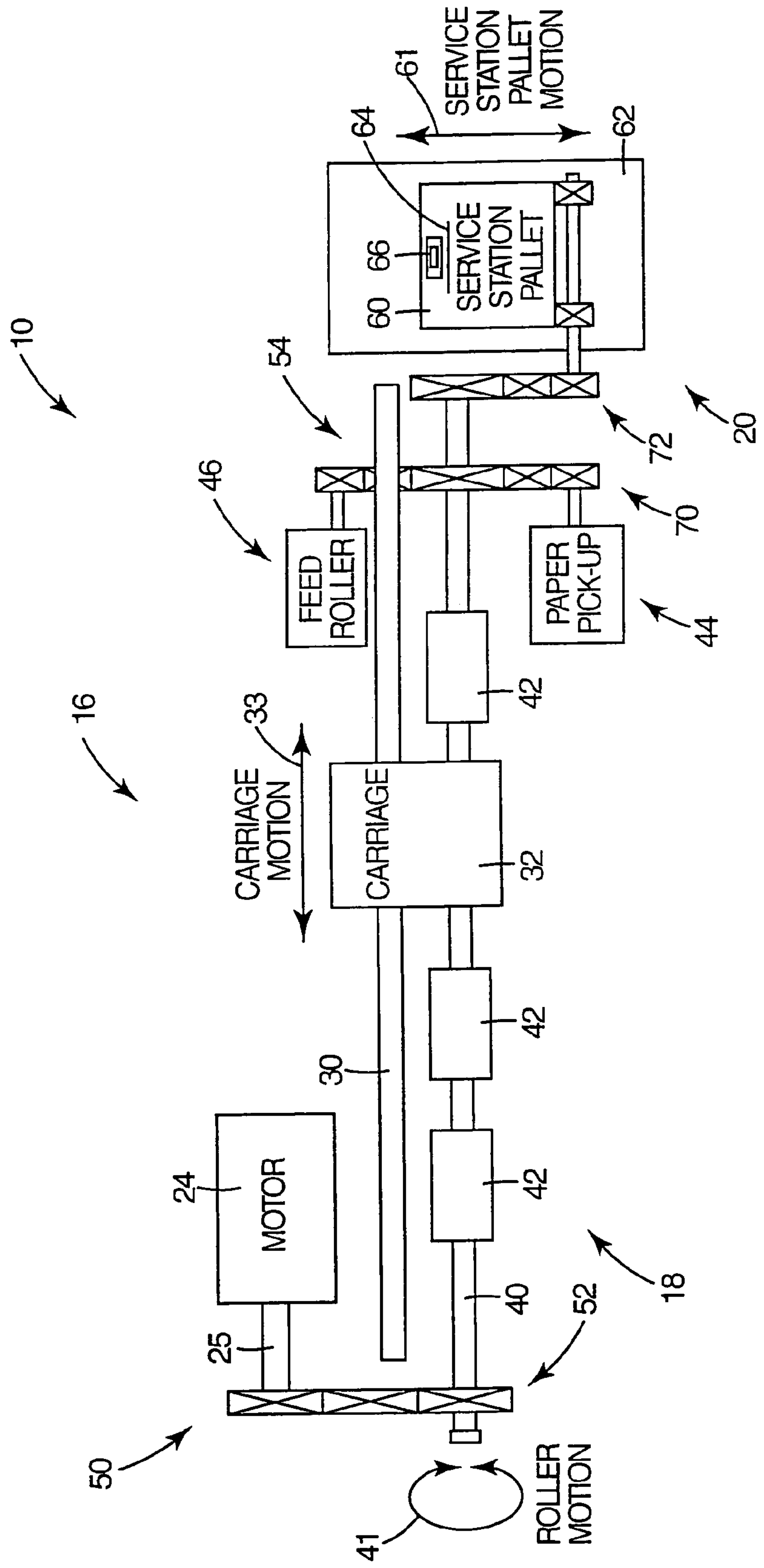
FIG. 2 is a schematic illustration of one embodiment of a portion of an inkjet printing system according to an embodiment of the present invention.

Referring to FIG. 2, inkjet printing system 10 includes a drive motor 24. Motor 24 is operatively coupled with print media transport assembly 18 and service station assembly 20. As such, motor 24 operates, drives, or powers both print media transport assembly 18 and service station assembly 20. Thus, power from motor 24 is selectively transmitted to both print media transport assembly 18 and service station assembly 20, as described below. Motor 24, therefore, includes an output 25 which is selectively coupled with both print media transport assembly 18 and service station assembly 20. It is understood that FIG. 2 is a simplified schematic illustration of a portion of inkjet printing system 10.

In one embodiment, carriage assembly 16 includes a carriage rail 30 and a carriage 32. Carriage rail 30 is mounted in a housing (not shown) of inkjet printing system 10 and provides a guide for carriage 32. Carriage 32 carries inkjet printhead assembly 12 and is slidably mounted on carriage rail 30 for lateral movement, as indicated by bi-directional arrow 33. As such, carriage 32 moves inkjet printhead assembly 12 back and forth across print medium 19.

In one embodiment, print medium transport assembly 18 includes a drive shaft 40 and one or more rollers 42. Drive shaft 40 is mounted in a housing (not shown) of inkjet printing system 10 for rotational movement, as indicated by bi-directional arrow 41. Rollers 42 are mounted on drive shaft 40 to contact and route print medium 19 through a print media path of inkjet printing system 10. As such, rollers 42 advance print medium 19 relative to carriage 32 in a direction substantially perpendicular to the direction of motion of carriage 32.

In one embodiment, print media transport assembly 18 includes a paper pick-up assembly 44 and a feed roller assembly 46. Paper pick-up assembly 44 initially engages a top sheet of print medium 19 and routes print medium 19 to rollers 42. As such, feed roller assembly 46 advances print medium 19 through the print media path of inkjet printing system 10. Motion is imparted to paper pick-up assembly 44 and feed roller assembly 46 via drive shaft 40.

To transfer power of motor 24 to print media transport assembly 18, an embodiment of a power transmission arrangement, such as power transmission arrangement 50, is interposed between motor 24 and print media transport assembly 18. In one embodiment, power transmission arrangement 50 includes a gear train 52 which transfers rotational power of motor 24 to drive shaft 40 of print media transport assembly 18 and a gear train 54 which transfers rotational power of motor 24 to paper pick-up assembly 44 and/or feed roller assembly 46. Gear train 52, therefore, imparts rotational motion of motor 24 to drive shaft 40 and rollers 42. Gear train 54, therefore, imparts rotational motion of drive shaft 40 to paper pick-up assembly 44 and/or feed roller assembly 46.

In one embodiment, service station assembly 20 includes a service station sled or pallet 60 and a frame or chassis 62. In one embodiment, service station pallet 60 carries, for example, one or more wipers 64 which pass over inkjet printhead assembly 12 to clean and/or remove excess ink from a face of inkjet printhead assembly 12. In one embodiment, service station pallet 60 carries at least one cap 66 which covers inkjet printhead assembly 12 when not in use to prevent inkjet printhead assembly 12 from drying out.

Wiping and capping of inkjet printhead assembly 12 can utilize the motion of service station assembly 20 and, more specifically, motion of service station pallet 60 relative to inkjet printhead assembly 12. As such, service station pallet 60 is mounted in chassis 62 for movement, as indicated by bi-directional arrow 61. Thus, movement of service station pallet 60 is in a direction substantially perpendicular to the direction of movement of carriage 32. Accordingly, service station pallet 60 provides for orthogonal and translational wiping of inkjet printhead assembly 12.

To transfer power of motor 24 to service station assembly 20, an embodiment of a power transmission arrangement, such as power transmission arrangement 70, is interposed between motor 24 and service station assembly 20. In one embodiment, power transmission arrangement 70 includes an embodiment of a gear train, such as gear train 72, which transfers rotational power of motor 24 to service station pallet 60. Power from motor 24 is transferred to service station pallet 60 via gear train 72, as described in detail below.

Figure 3A:
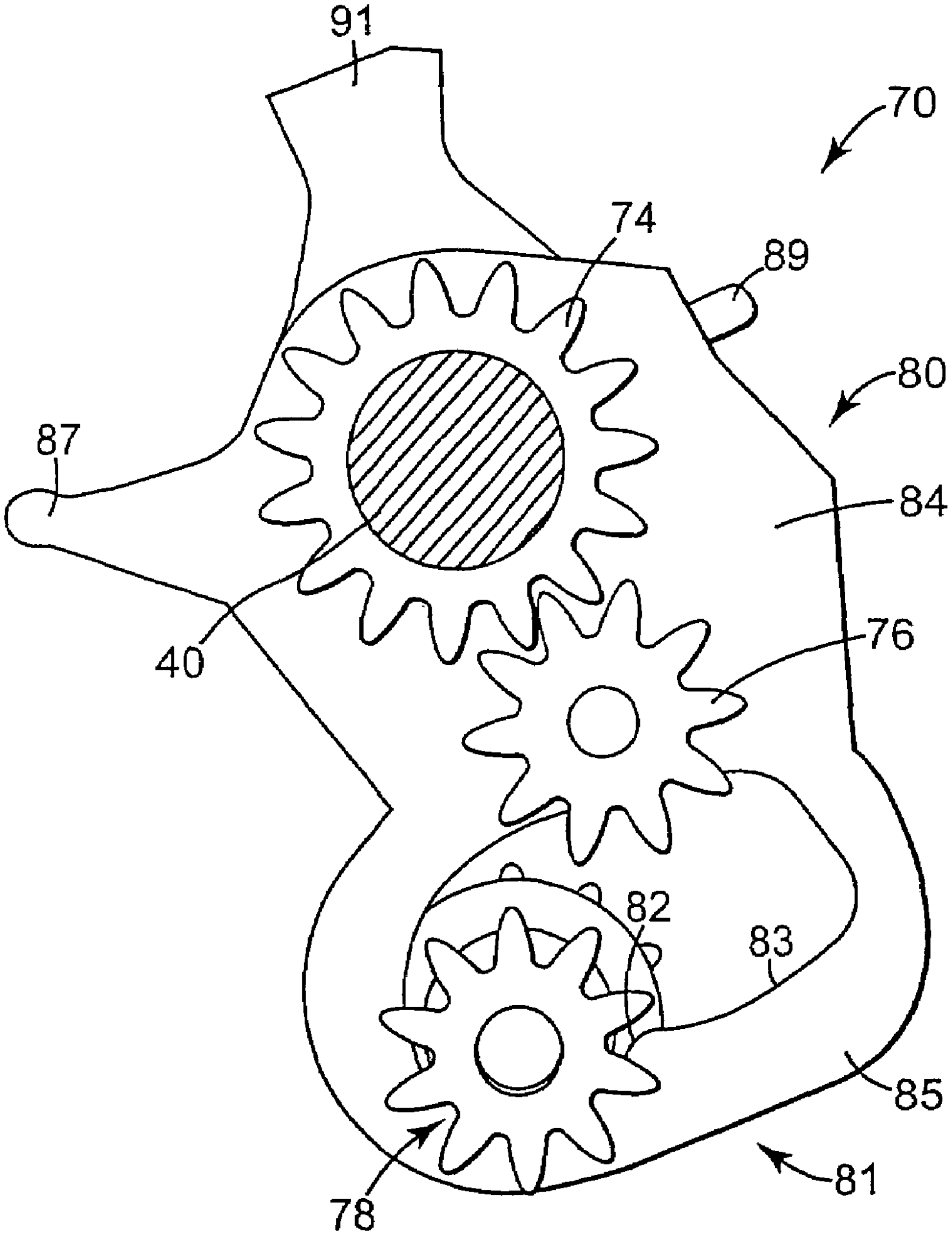
FIG. 3A is a sectional side view illustrating one embodiment of a portion of a service station power transmission arrangement in a disengaged mode.
Figure 3B:
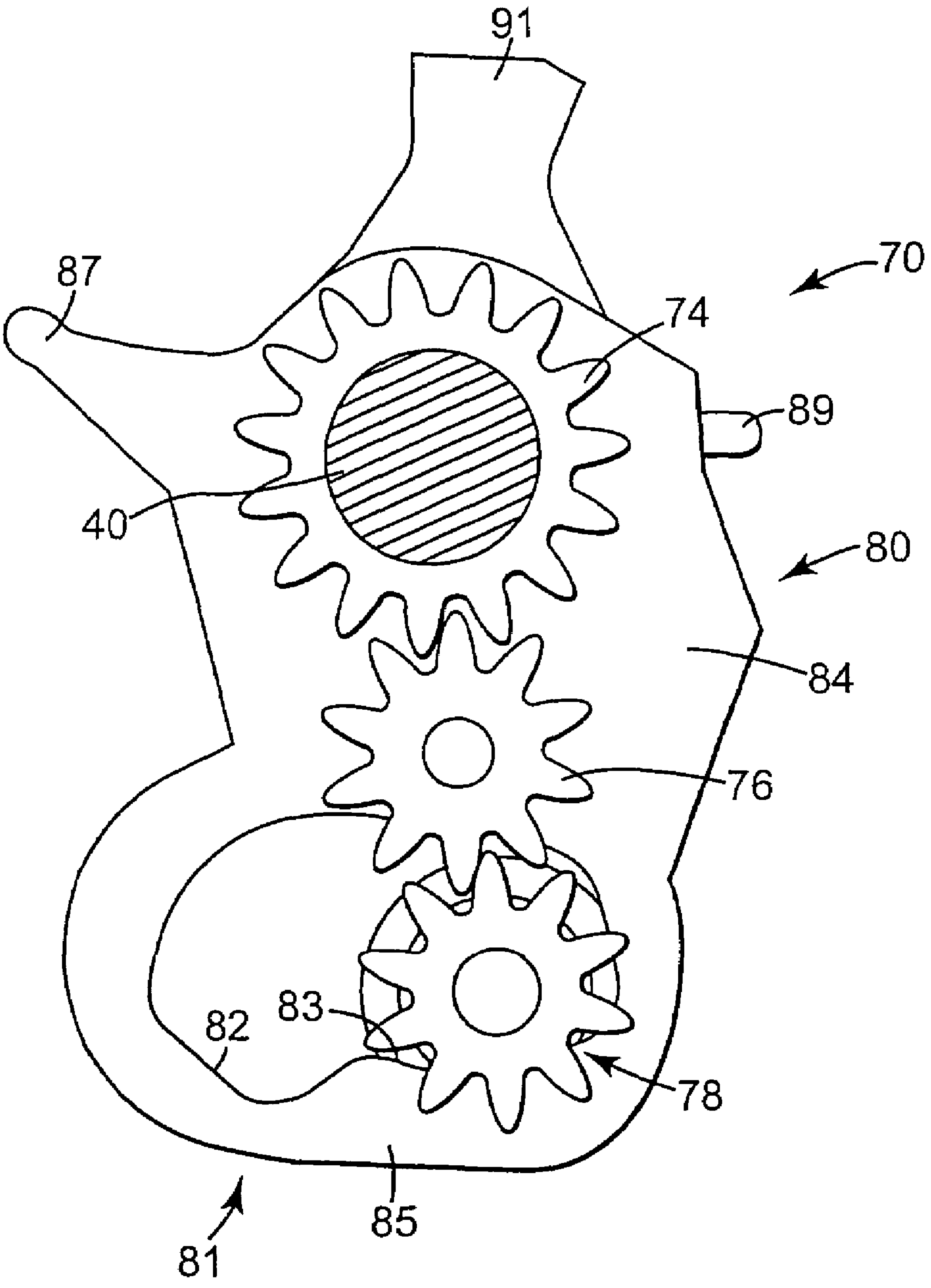
FIG. 3B is a sectional side view of the service station power transmission arrangement of FIG. 3A in an engaged mode.

FIGS. 3A and 3B illustrate one embodiment of power transmission arrangement 70. More specifically, FIG. 3A illustrates power transmission arrangement 70 in a disengaged mode of operation with power from motor 24 being uncoupled from service station assembly 20 and FIG. 3B illustrates power transmission arrangement 70 in an engaged mode of operation with power from motor 24 being coupled to service station assembly 20. In one embodiment, power transmission arrangement 70 includes an embodiment of a shift plate, such as shift plate 80, an embodiment of a drive gear, such as drive gear 74, an embodiment of an idler gear, such as idler gear 76, and an embodiment of a pinion gear, such as pinion gear 78. As such, drive gear 74, idler gear 76, and pinion gear 78 constitute one embodiment of gear train 72 (FIG. 2).

Shift plate 80 is supported for rotation between a first position, as illustrated in FIG. 3A, and a second position, as illustrated in FIG. 3B. In one embodiment, drive shaft 40 extends through and supports shift plate 80. As such, shift plate 80 is supported by and rotatable relative to drive shaft 40. Thus, shift plate 80 is rotatable between the first position and the second position about an axis of drive shaft 40. Rotation of shift plate 80 between the first position and the second position moves pinion gear 78 between a disengaged position and an engaged position with idler gear 76, as described below.

Drive gear 74 is mounted on drive shaft 40 for rotation with drive shaft 40. As such, drive gear 74 is rotatable relative to shift plate 80. In addition, idler gear 76 is supported by shift plate 80 and engaged with drive gear 74. Idler gear 76 is freely supported by shift plate 80 such that rotational motion of drive gear 74 is imparted to idler gear 76.

In one embodiment, pinion gear 78 is supported by shift plate 80 and moveable between a disengaged position, as illustrated in FIG. 3A, and an engaged position, as illustrated in FIG. 3B. More specifically, in the disengaged position, pinion gear 78 is disengaged from idler gear 76 such that rotational motion of drive gear 74 is not imparted to pinion gear 78 via idler gear 76. However, in the engaged position, pinion gear 78 is engaged with idler gear 76 such that rotational motion of drive gear 74 is imparted to pinion gear 78 via idler gear 76.

In one embodiment, shift plate 80 includes a cam feature 81 which moves pinion gear 78 between the disengaged position and the engaged position when shift plate 80 is rotated between the first position and the second position. In this embodiment, cam feature 81 includes a first cam surface 82 and a second cam surface 83. First cam surface 82 and second cam surface 83 are arranged such that pinion gear 78 is supported by first cam surface 82 when in the disengaged position and second cam surface 83 when in the engaged position. As such, when shift plate 80 is rotated between the first position and the second position, pinion gear 78 follows first cam surface 82 and then second cam surface 83 so as to move between the disengaged position and the engaged position. Thus, pinion gear 78 engages idler gear 76 such that drive gear 74 drives pinion gear 78 via idler gear 76 when shift plate 80 is in the second position.

In one embodiment, shift plate 80 includes a body portion 84 and an arm portion 85 extending from body portion 84. As such, drive gear 74 and idler gear 76 are supported by body portion 84 and cam feature 81, including first cam surface 82 and second cam surface 83, is formed on arm portion 85.

Figure 4A:
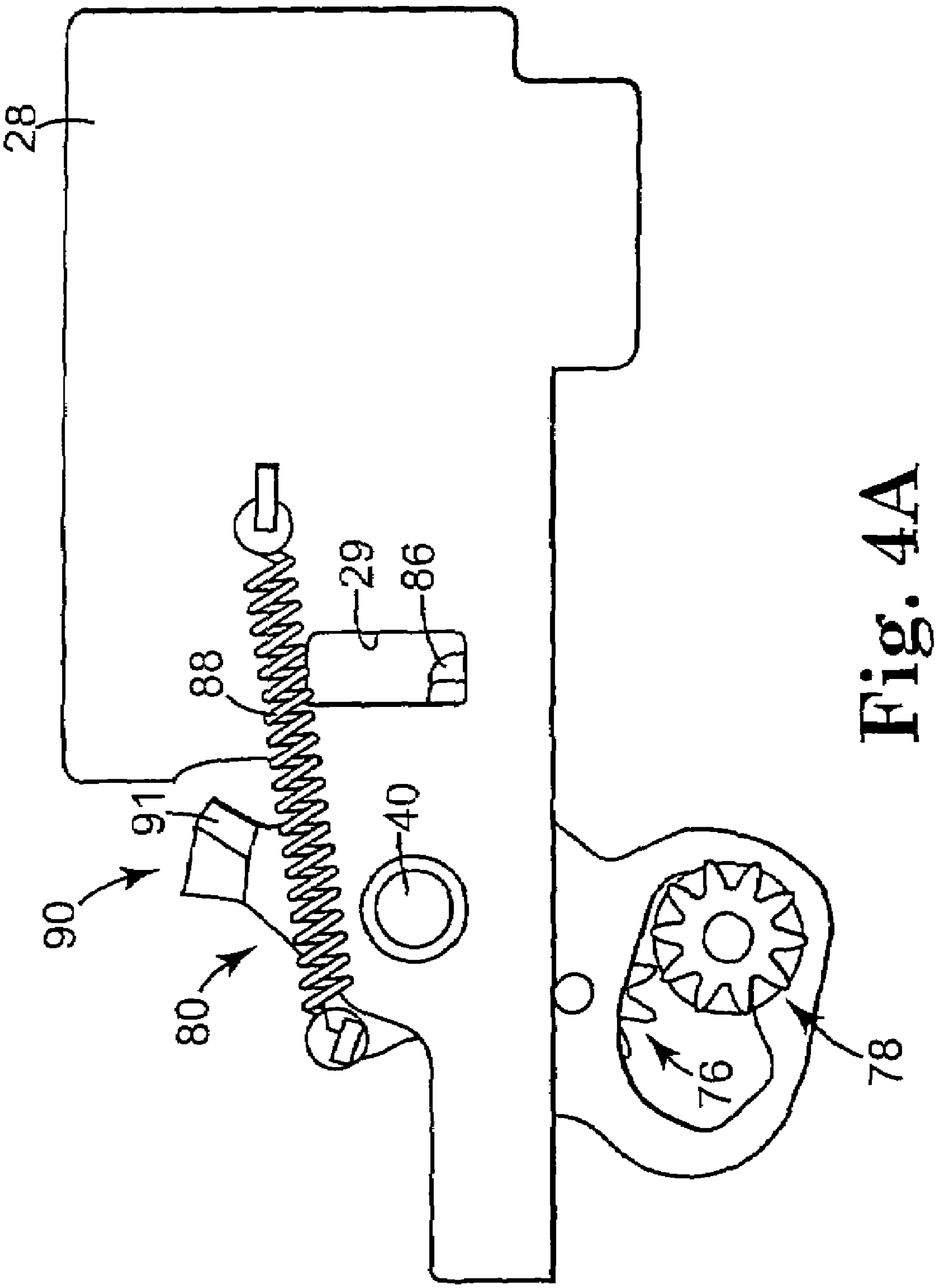
FIG. 4A is a schematic side view illustrating one embodiment of a portion of an inkjet printing system including the service station power transmission arrangement of FIG. 3A in the disengaged mode.
Figure 4B:
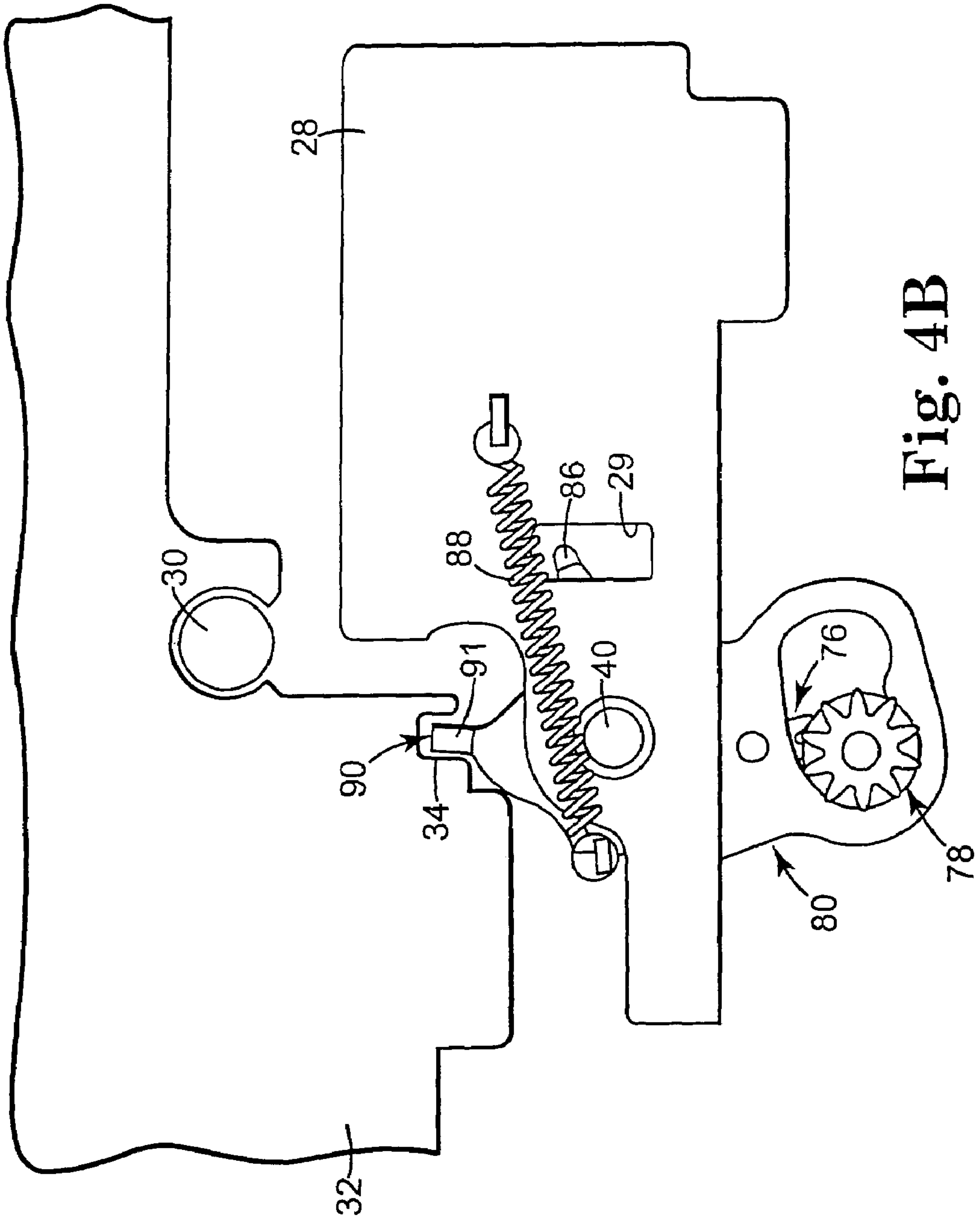
FIG. 4B is a schematic side view illustrating the portion of the inkjet printing system of FIG. 4A including the service station power transmission arrangement of FIG. 3B in the engaged mode.

As illustrated in the embodiment of FIGS. 4A and 4B, inkjet printing system 10 includes a support plate 28 which supports shift plate 80 and, more specifically, drive shaft 40. In one embodiment, shift plate 80 includes a stop 86 which interacts with support plate 28 to limit rotation of shift plate 80. Stop 86 includes, for example, an arm 87 (FIGS. 3A and 3B) which protrudes from shift plate 80 and extends into an opening 29 of support plate 28 such that in the first position (FIG. 4A), stop 86 of shift plate 80 contacts support plate 28.

In one embodiment, as illustrated in FIG. 4A, shift plate 80 is biased to the first position. Shift plate 80 is biased, for example, by a spring 88 secured at one end to shift plate 80 and at another end to support plate 28. As such, stop 86 limits rotation of shift plate 80 as induced by spring 88. In one embodiment, spring 88 is secured to a hook 89 (FIGS. 3A and 3B) protruding from shift plate 80.

In one embodiment, movement of carriage assembly 16 actuates power transmission arrangement 70 to selectively couple motor 24 with service station assembly 20. More specifically, as illustrated in FIG. 4B, movement of carriage 32 rotates shift plate 80 between the first position and the second position. For example, as carriage 32 traverses an end of carriage rail 30 in a direction toward service station assembly 20, carriage 32 contacts shift plate 80 and rotates shift plate 80 to the second position. As such, pinion gear 78 is moved by cam feature 81, including, more specifically, second cam surface 83, to the engaged position (FIG. 3B).

In one embodiment, shift plate 80 includes a cam or gathering feature 90 which interacts with carriage 32 to rotate shift plate 80 to the second position. Gathering feature 90 includes, for example, a tab 91 (FIGS. 3A and 3B) which protrudes from shift plate 80 and fits into a slot or groove 34 in carriage 32. In one embodiment, tab 91 and/or groove 34 include angled surfaces which mate and cause shift plate 80 to rotate between the first position and the second position in response to lateral movement of carriage 32.

Figure 5A:
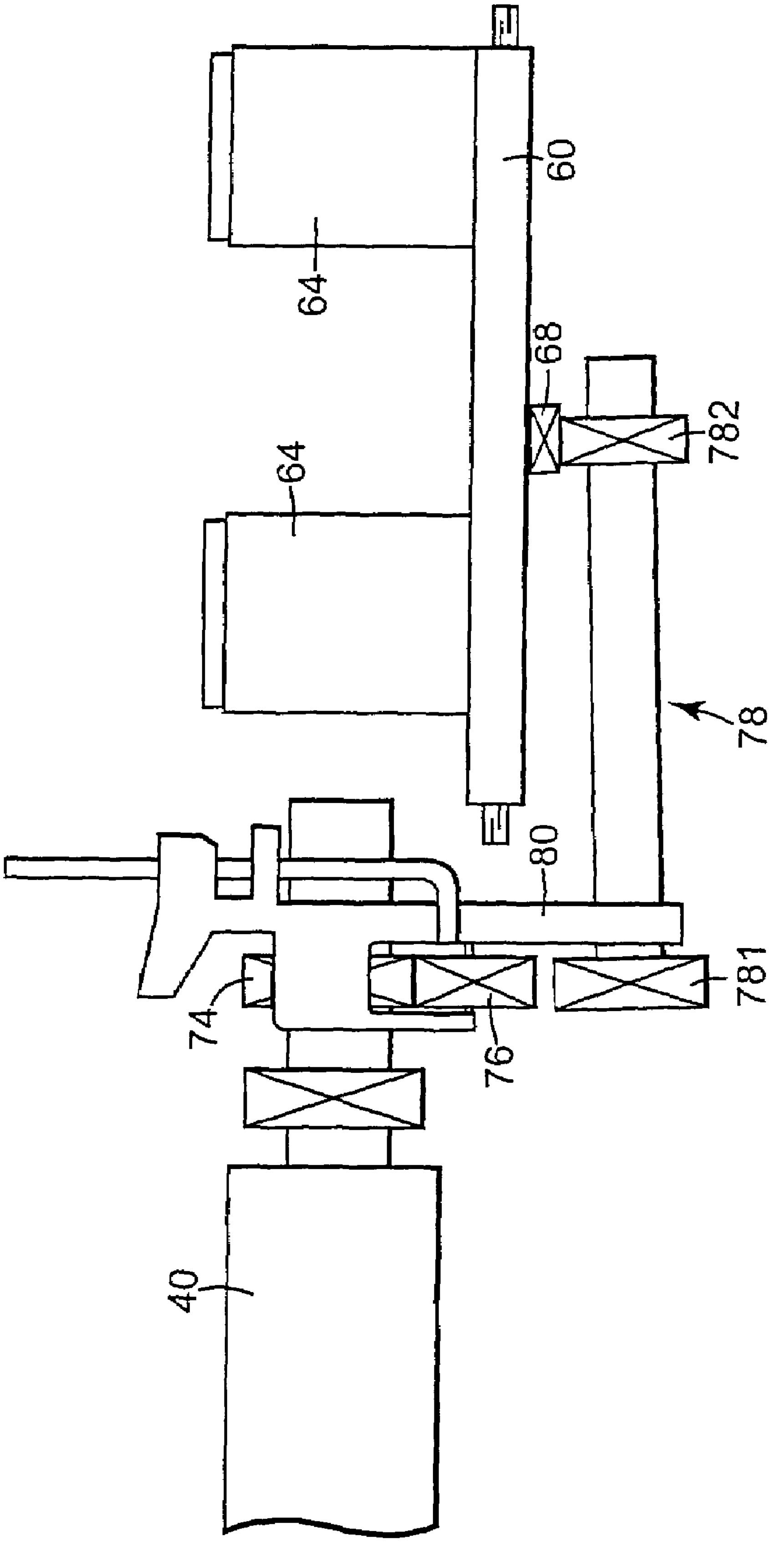
FIG. 5A is a schematic front view illustrating one embodiment of a portion of an inkjet printing system including the service station power transmission arrangement of FIG. 3A in the disengaged mode.
Figure 5B:
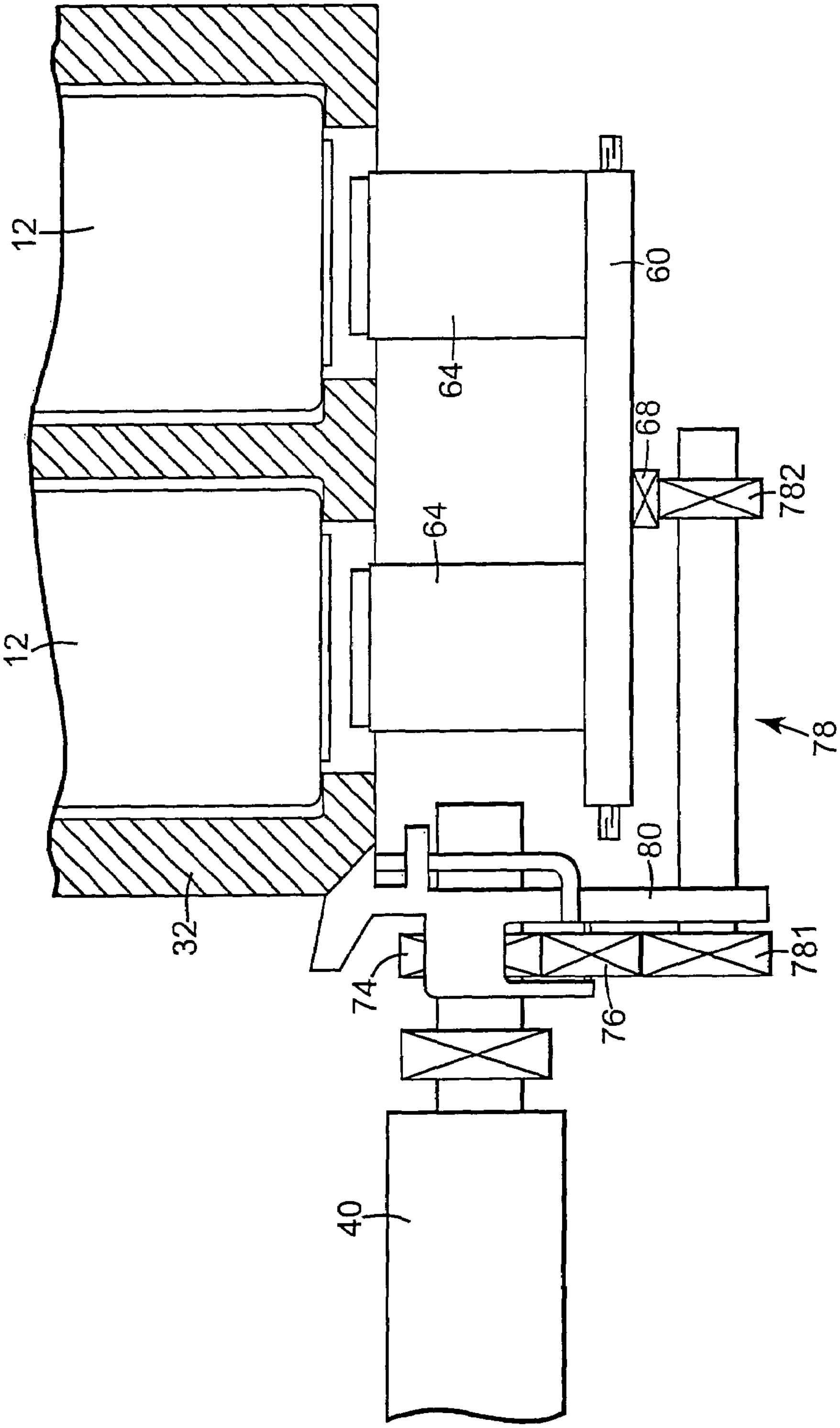
FIG. 5B is a schematic front view illustrating the portion of the inkjet printing system of FIG. 5A including the service station power transmission arrangement of FIG. 3B in the engaged mode.

As illustrated in the embodiment of FIGS. 5A and 5B, pinion gear 78 includes a first gear wheel 781 and a second gear wheel 782. As such, first gear wheel 781 selectively engages idler gear 76, as described above, and second gear wheel 782 engages corresponding teeth or gearing 68 of service station pallet 60. More specifically, when shift plate 80 is in the first position, as described above, first gear wheel 781 of pinion gear 78 is disengaged from idler gear 76. As such, power from motor 24, via drive shaft 40, is not imparted to first gear wheel 781 of pinion gear 78 and, therefore, service station pallet 60.

However, when shift plate 80 is in the second position, as described above, first gear wheel 781 of pinion gear 78 is engaged with idler gear 76. As such, power from motor 24, via drive shaft 40, drive gear 74, and idler gear 76, is imparted to first gear wheel 781 of pinion gear 78. Thus, rotational motion is imparted to second gear wheel 782 of pinion gear 78 and, therefore, gearing 68 of service station pallet 60. Accordingly, service station pallet 60 is selectively moved in the direction of bi-directional arrow 61 (FIG. 2) to service inkjet printhead assembly 12 as supported in carriage 32. In one embodiment, as illustrated in FIG. 5B, carriage 32 carries two inkjet printhead assemblies 12 and service station pallet 60 carries two wipers 64 which pass over respective inkjet printhead assemblies 12.

By selectively coupling motor 24 with print media transport assembly 18 and service station assembly 20, motor 24 can operate functions of both print media transport assembly 18 and service station assembly 20. Thus, motor 24 can control multiple functions of inkjet print system 10, such as transporting print medium 19 and/or maintaining inkjet printhead assembly 12. Thus, by controlling multiple functions of inkjet print system 10 with single motor 24, inkjet printing system 10 may be made smaller or made to perform more functions for the same size, may be easier to manufacture, and/or may be less expensive to manufacture.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A power transmission arrangement, comprising:

a shaft;

a first gear mounted on the shaft:

a plate supported by the shaft and rotatable between a first position and a second position about an axis of the shaft;

a second gear supported by the plate and engaged with the first gear; and a third gear supported by the plate and movable between a disengaged position and an engaged position with the second gear when the plate is rotated between the first position and the second position, wherein the third gear is supported by the plate when the third gear is in both the disengaged position and the engaged position with the second gear;

wherein the plate includes a cam feature adapted to move the third gear between the disengaged position and the engaged position when the plate is rotated between the first position and the second position;

wherein the cam feature includes a first cam surface and a second cam surface, wherein the third gear is supported by the first cam surface when in the disengaged position and the second cam surface when in the engaged position.

2. The power transmission arrangement of claim 1, wherein the first gear is adapted to drive the third gear via the second gear when the plate is in the second position.

3. The power transmission arrangement of claim 1, further comprising:

a spring coupled to the plate, wherein the spring is adapted to bias the plate to the first position.

4. The power transmission arrangement of claim 1, wherein the plate includes a stop adapted to limit rotation of the plate and establish the first position thereof.

5. A power transmission arrangement for transmitting power from a drive shaft, comprising:

a drive gear driven by the drive shaft;

an idler gear engaging the drive gear;

a pinion gear selectively engaging the idler gear; and a shift plate supported by the drive shaft and supporting the idler gear and the pinion gear, wherein the shaft plate is rotatable about an axis of the drive shaft;

wherein rotating the shift plate selectively engages and disengages the pinion gear with the idler gear, and wherein the shift plate supports the pinion gear when the pinion gear is both engaged and disengaged with the idler gear;

wherein the shift plate includes a cam feature supporting the pinion gear, and wherein rotating the shift plate includes moving the pinion gear with the cam feature to selectively engage the pinion gear with the idler gear;

wherein the cam feature includes a first cam surface and a second cam surface, and wherein moving the pinion gear with the cam feature includes moving the pinion gear along the first cam surface and the second cam surface.

6. The power transmission arrangement of claim 5, wherein selectively engaging the pinion gear with the idler gear includes driving the pinion gear with the drive gear via the idler gear.

7. The power transmission arrangement of claim 5, wherein rotating the shift plate includes overcoming a biasing force on the shift plate.

8. A power transmission arrangement, comprising:

a drive shaft;

a drive gear mounted on the drive shaft;

a shift plate supported by the drive shaft and rotatable between a first position and a second position about an axis of the drive shaft, the shift plate including a first cam surface and a second cam surface;

an idler gear supported by the shift plate and engaged with the drive gear; and a pinion gear supported by the shift plate and movable between a disengaged position and an engaged position with the idler gear, wherein the pinion gear is supported by the first cam surface of the shift plate when in the disengaged position and supported by the second cam surface of the shift plate when in the engaged position.

9. The power transmission arrangement of claim 8, wherein the pinion gear is driven by the drive gear via the idler gear when in the engaged position.

10. The power transmission arrangement of claim 8, wherein the first cam surface and the second cam surface are formed on an arm of the shift plate.

11. The power transmission arrangement of claim 8, further comprising:

a spring coupled to the shift plate and adapted to bias the shift plate to the first position.

12. The power transmission arrangement of claim 8, wherein the shift plate includes a stop adapted to limit rotation of the shift plate and establish the first position thereof.

* * * * *

UNITED STATES PATENT AND TRADEMARK OFFICE
CERTIFICATE OF CORRECTION

PATENT NO. : 7,225,697 B2
APPLICATION NO. : 10/657973
DATED : June 5, 2007
INVENTOR(S) : Wesley R. Schalk et al.

It is certified that error appears in the above-identified patent and that said Letters Patent is hereby corrected as shown below:

In column 7, line 19, in Claim 1, delete “shaft:” and insert -- shaft; --, therefor.

In column 8, line 2, in Claim 5, delete “shaft” and insert -- shift --, therefor.

Signed and Sealed this

Twelfth Day of August, 2008

JON W. DUDAS
*Director of the United States Patent and Trademark Office*